Feb. 8, 1966    J. F. CALVERT    3,234,445
A.C.-D.C. DYNAMO ELECTRIC MACHINERY
Filed April 4, 1962    9 Sheets-Sheet 1
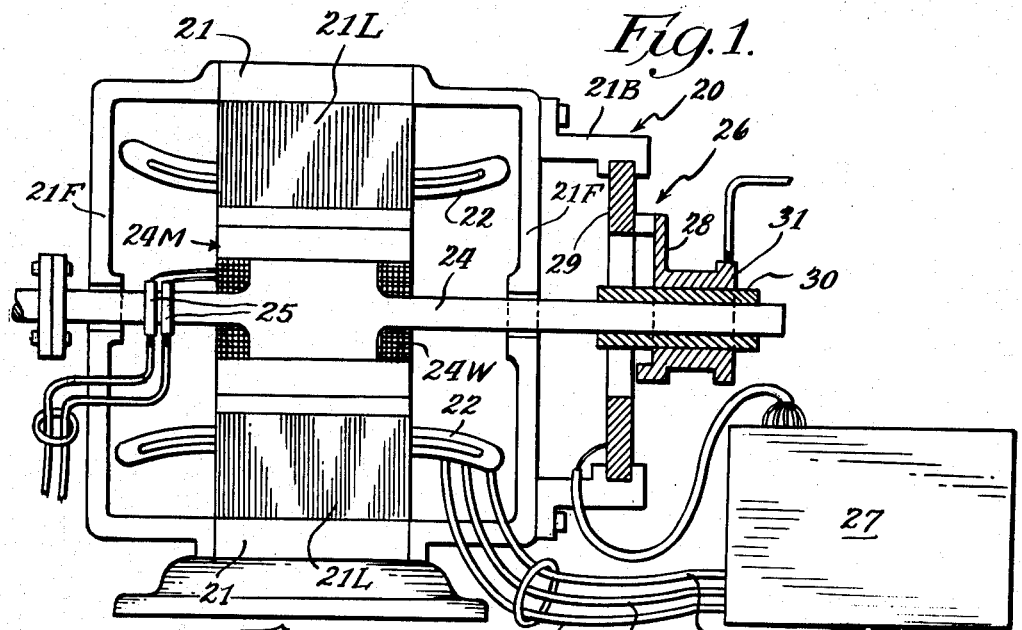
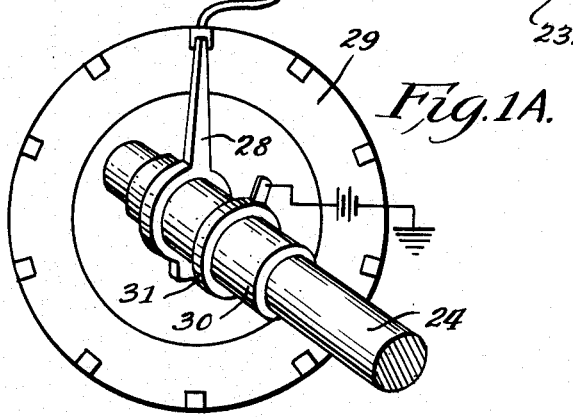
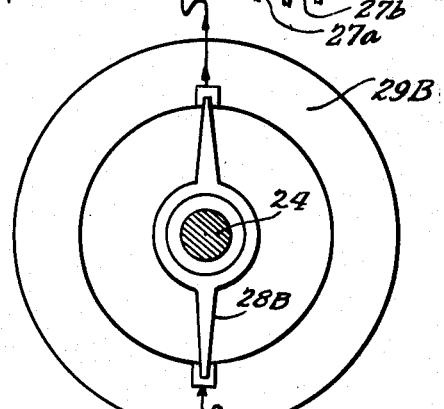
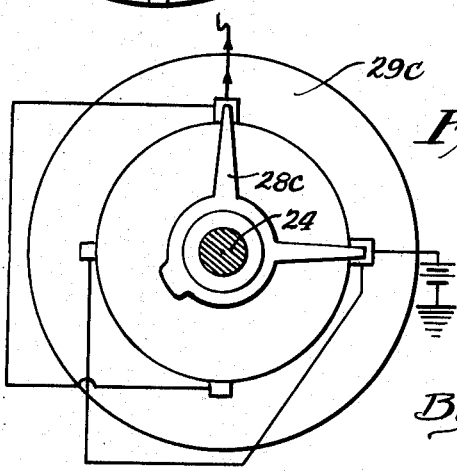
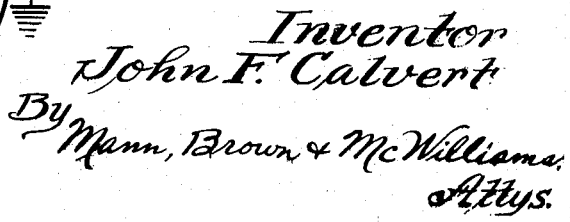
Inventor
John F. Calvert
By Mann, Brown, & McWilliams
Attys.

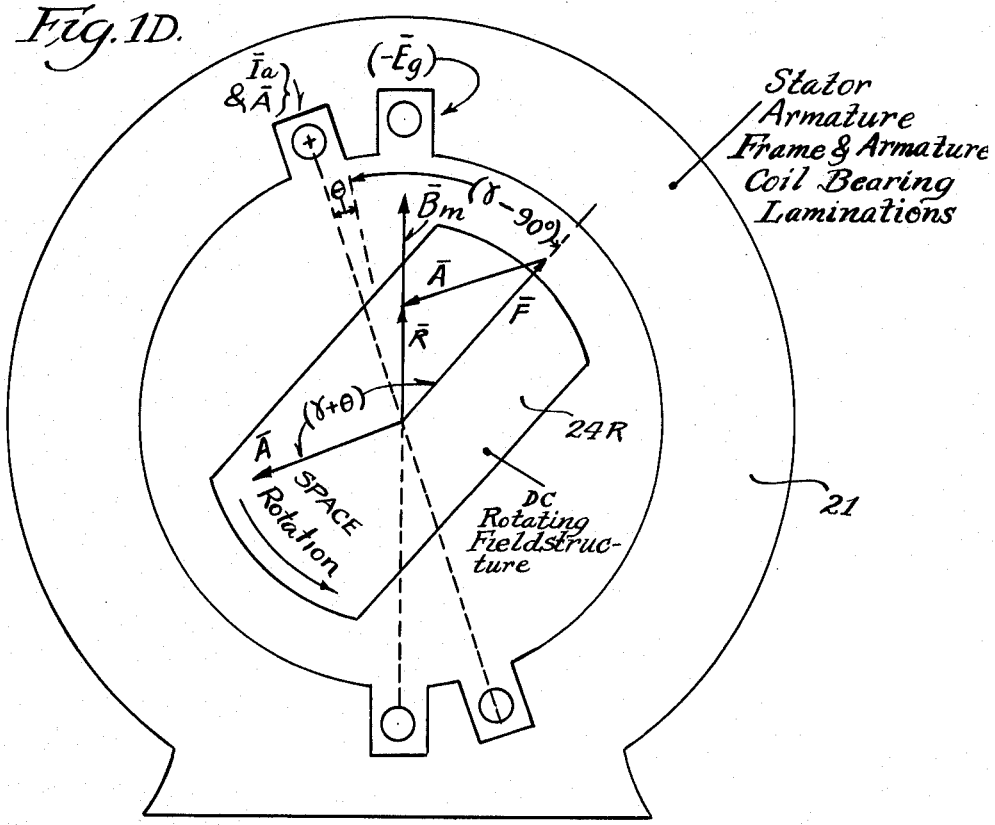

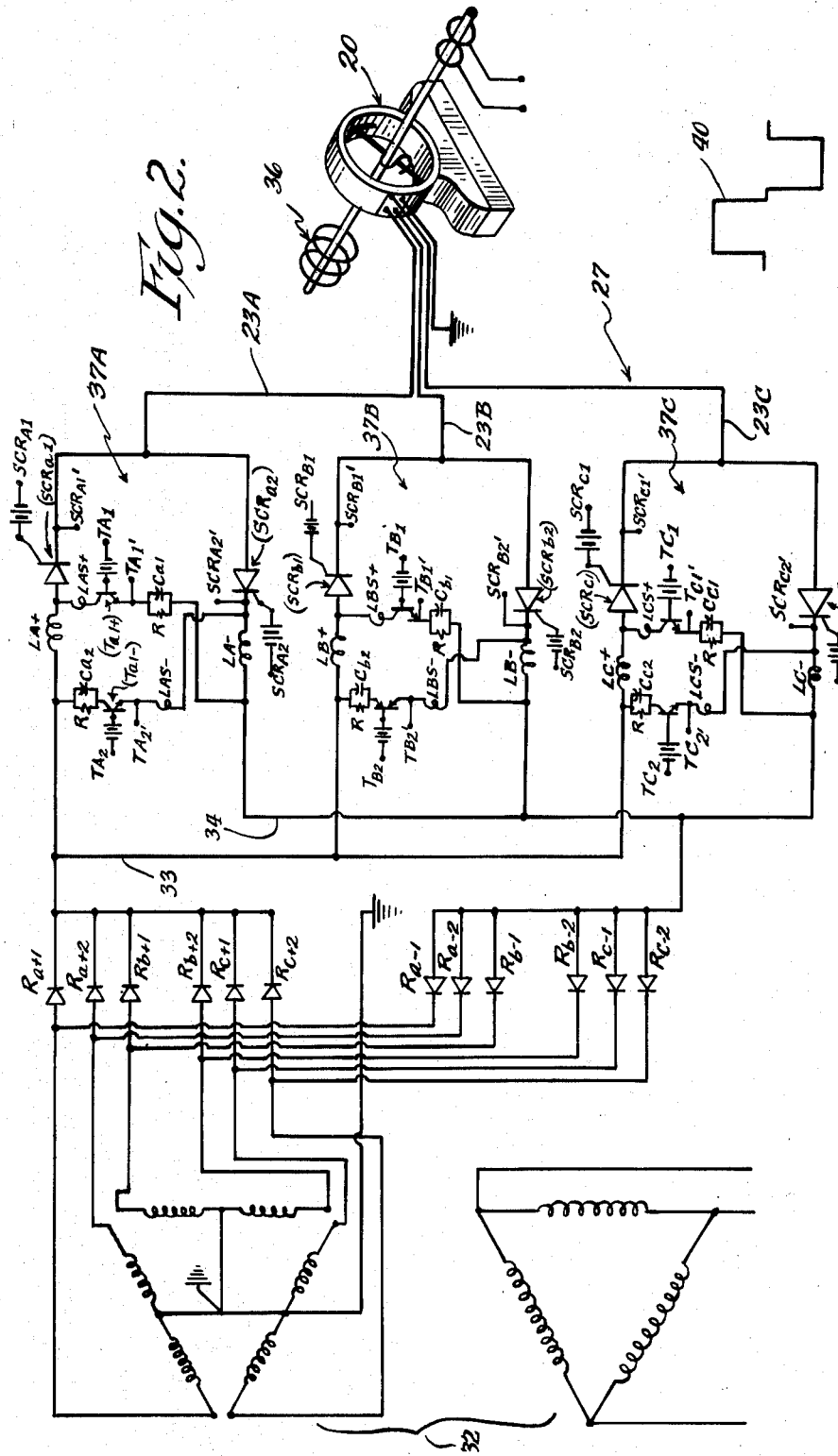

Feb. 8, 1966 J. F. CALVERT 3,234,445
A.C.-D.C. DYNAMO ELECTRIC MACHINERY
Filed April 4, 1962 9 Sheets-Sheet 4

Inventor
John F. Calvert
By Mann, Brown & McWilliams,
Attys.

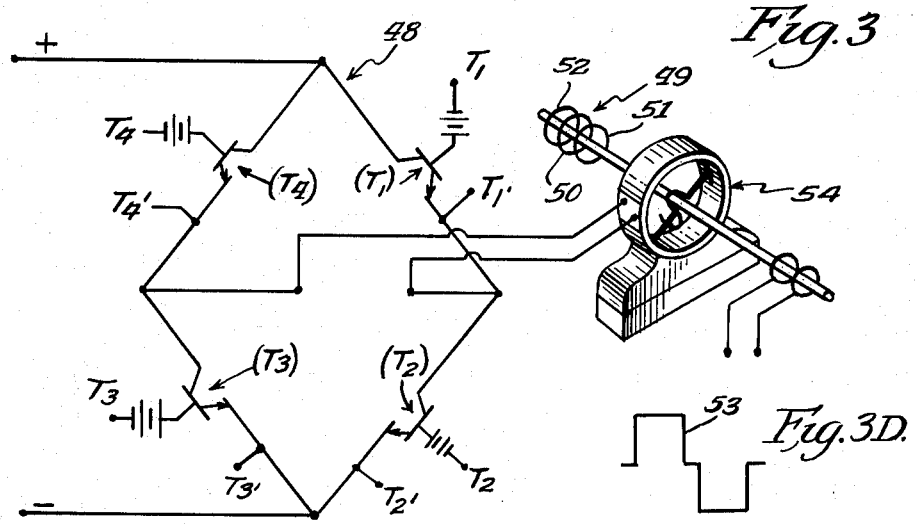
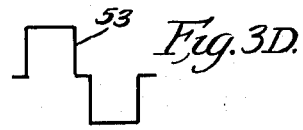
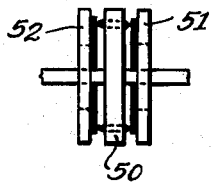
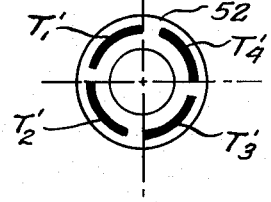
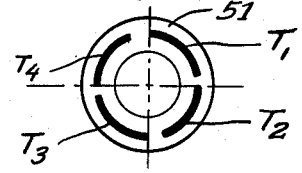
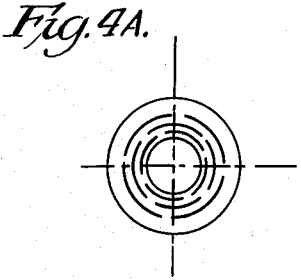
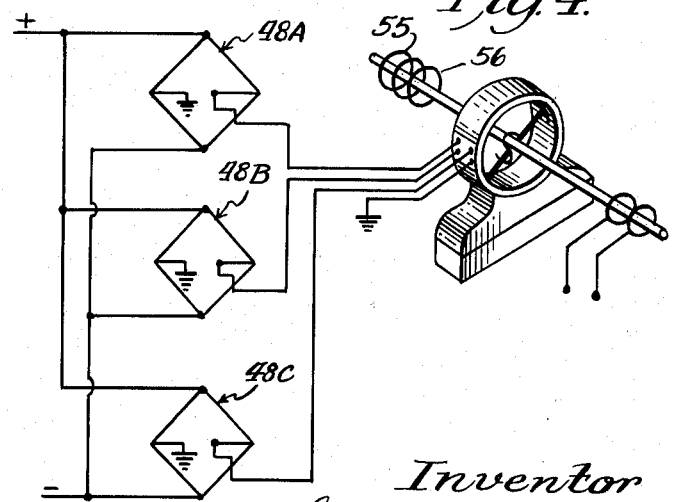
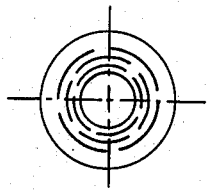

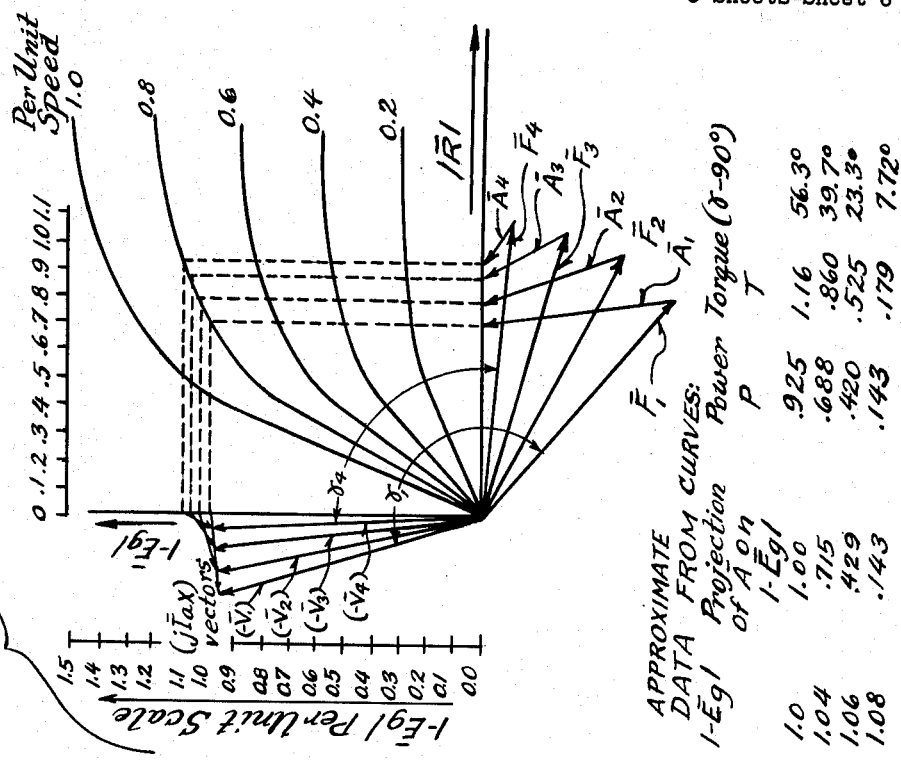
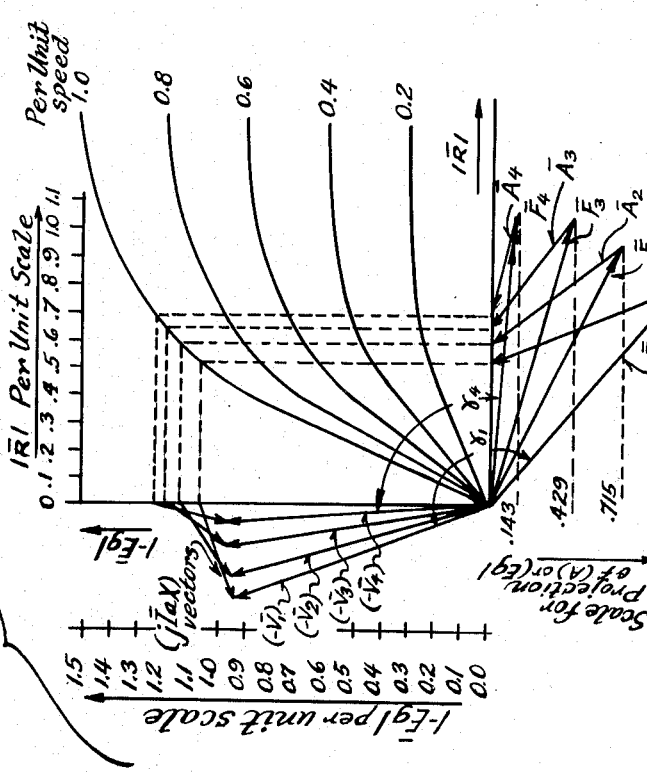
Fig. 5A.
Fig. 5.

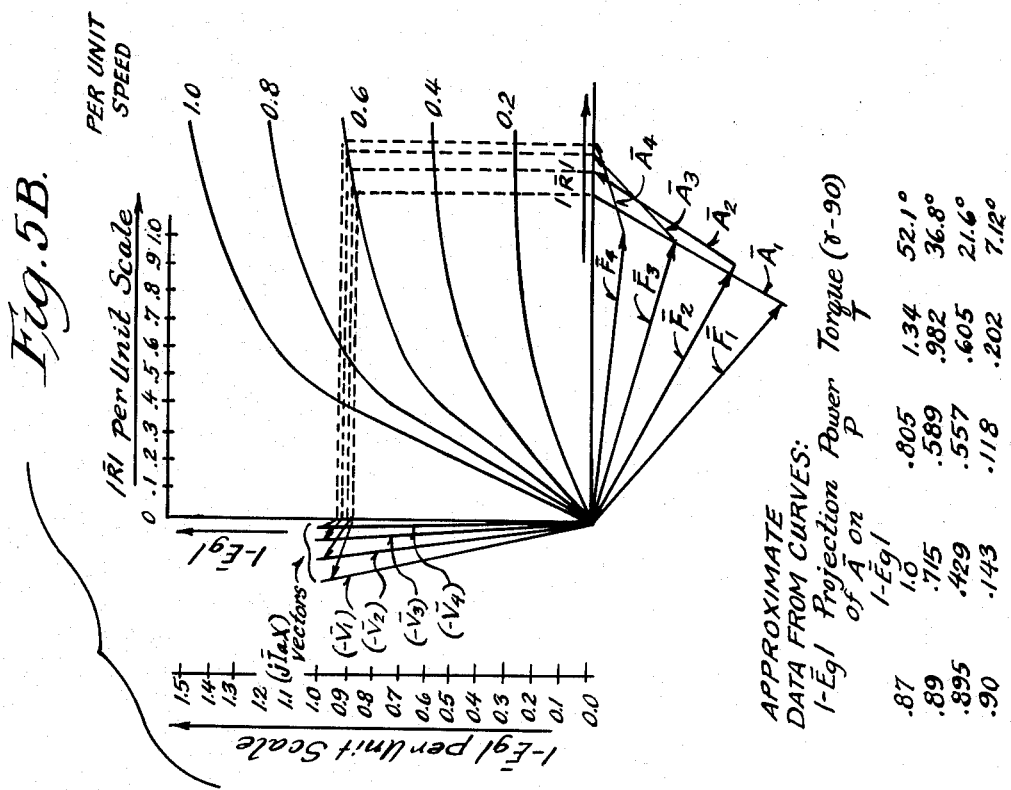
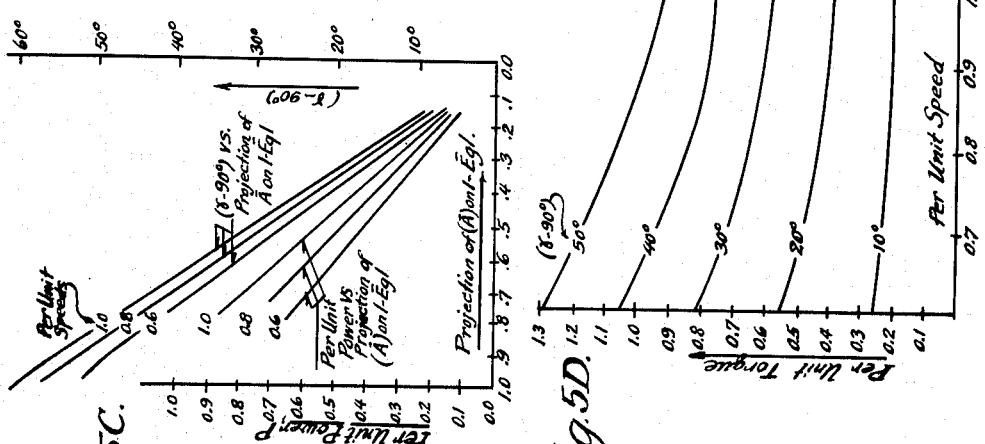
Fig. 5B.
Fig. 5C.
Fig. 5D.

Fig. 6.
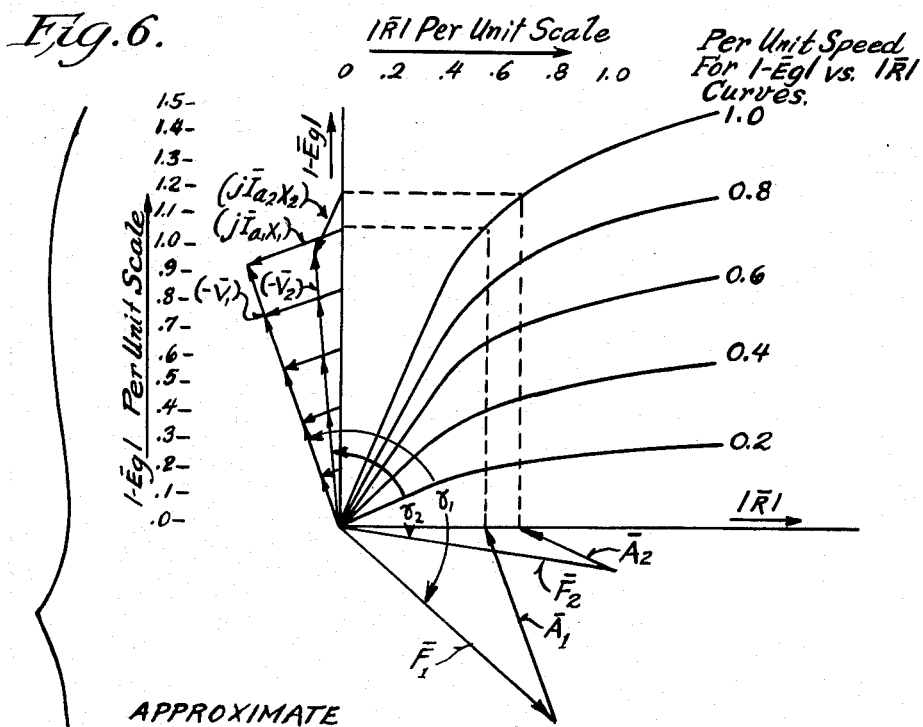
|R̄| Per Unit Scale  
Per Unit Speed For $|-\bar{E}_g|$ vs. $|\bar{R}|$ Curves.
APPROXIMATE DATA FOR FIGURE (6) WITH $\gamma = \gamma_1$
| SPEED | $|-\bar{E}_g|$ | PROJECTION OF $(\bar{A})$ ON $|-\bar{E}_g|$ AXIS | POWER P | TORQUE T |
|---|---|---|---|---|
| 1.0 | 1.065 | 1.00 | 1.00 | 1.00 |
| 0.80 | 0.845 | 1.00 | 0.80 | 1.00 |
| 0.60 | 0.635 | 1.00 | 0.60 | 1.00 |
| 0.40 | 0.424 | 1.00 | 0.40 | 1.00 |
| 0.20 | 0.212 | 1.00 | 0.20 | 1.00 |
| 0.00 | 0.000 | 1.00 | 0.00 | 1.00 |
APPROXIMATE DATA FOR FIGURE (6) WITH $\gamma = \gamma_2$:
| | | | | |
|---|---|---|---|---|
| 1.00 | 1.20 | 0.257 | 0.291 | 0.291 |
| 0.80 | 0.96 | 0.257 | 0.2325 | 0.291 |
| 0.60 | 0.72 | 0.257 | 0.1745 | 0.291 |
| 0.40 | 0.48 | 0.257 | 0.1162 | 0.291 |
| 0.20 | 0.24 | 0.257 | 0.0581 | 0.291 |
| 0.00 | 0.00 | 0.257 | 0.0000 | 0.291 |
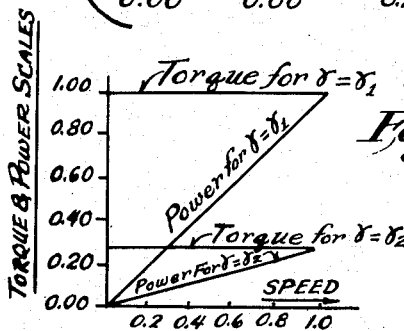
Fig. 6A.
Inventor  
John F. Calvert  
By Mann, Brown & McWilliams

United States Patent Office 3,234,445
Patented Feb. 8, 1966

3,234,445
A.C.-D.C. DYNAMO ELECTRIC MACHINERY
John F. Calvert, 3603 Ridgewood Drive,
Pittsburgh 35, Pa.
Filed Apr. 4, 1962, Ser. No. 185,083
16 Claims. (Cl. 318—175)

This invention relates to dynamo electric machinery or alternators of the so-called synchronous type, herein to be called A.C.-D.C. machines because of their characteristics, and more particularly, the invention is concerned with controlling such machinery for maintaining synchronous relationships continuously therein along with speed control and the like.

The principles of the invention are applicable both to motors and to generators, but for simplicity, the following discussion is related to motors. The present invention may be embodied in the familiar construction of a conventional type synchronous motor, the armature windings are applied to the stator and are suitably positioned and connected as to create, when carrying appropriate A.C. currents, a continuously rotating armature magnetomotive force moving at a speed determined by the frequency of the applied A.C. power. The rotor has a D.C. magnet pole arrangement and rotates at a speed to provide a continuously rotating D.C. field vector $\overline{F}$ that bears a synchronous relation to the armature air gap magnetomotive force and bears a substantially synchronous relation to the applied armature voltage vector $(-\overline{V})$.

On a per unit basis, the electrical power delivered to the motor is equal to the products of the magnitudes of the applied voltage $|-\overline{V}|$ and the armature demagnetizing ampere turns $|\overline{A}|$ times the cosine of the angle between the vectors $(-\overline{V})$ and $(\overline{A})$. The power transmitted across the air gap of the machine is equal to the products of the absolute values of the armature generated voltage vector $|-\overline{E}_g|$ and the armature demagnetizing ampere turn vector $|\overline{A}|$ times the cosine of the angle between the said vectors $(-\overline{E}_g)$ and $\overline{A}$. Neither of these angles is readily usable in physical equipment. However, the angle gamma ($\gamma$) between the field excitation vector $\overline{F}$ and the applied armature voltage vector $(-\overline{V})$ can be made use of. The product of $|-\overline{V}|$ times $|\overline{F}|$ times the negative of cosine $\gamma$ is a good approximation of the power received by and delivered by the motor.

In a conventional synchronous motor there is no direct control over the angle gamma. If the load is increased while the magnitude of the vectors $|-\overline{V}|$ and $|\overline{F}|$, and also the frequency of the input voltage remain unchanged, the angle gamma increases to provide more power across the gap. Momentarily, the conventional synchronous motor decelerates to permit the required increase in the angle gamma, and thereafter the motor restores to its original synchronous speed. If the load is now maintained constant and the absolute value of the vector $|\overline{F}|$ is increased, the motor will accelerate momentarily to provide a resulting decrease in the angle gamma. It should be noted that during the time when the angle gamma is changing, while the applied frequency remains constant, a conventional synchronous motor is not maintaining a true synchronous relationship between the vectors $(-\overline{V})$ and $\overline{F}$.

The construction of an A.C.-D.C. motor of this invention may be generally similar to that of a conventional synchronous motor, and, under steady state conditions, the A.C.-D.C. motor of this invention will function in essentially the same fashion as a conventional synchronous motor. The motor control provided by the present invention is importantly different from that of a conventional synchronous motor, as is its performance under changing load conditions and under changing speed requirements. Although the motor of this invention has its armature connected to receive power from an A.C. source, in terms of speed torque characteristics and the like, it operates in a manner somewhat similar to the performance of a separately excited D.C. motor inasmuch as each may have both output torque and speed varied by changing the magnitude of the armature voltage, the magnitude of the field excitation, the angle around the air gaps between where armature voltage is supplied and where the field magnetomotive force is directed, or various combinations of these said properties of the machines. Also, it may be noted that the similarity in construction is such that the principles of this invention may be applied for converting existing A.C. synchronous motors to provide a variable yet controlled speed motor rather than a constant speed motor. Moreover, the motor when modified in accordance with this invention may be run at any speed required under conditions involving varying or constant load torque.

In a conventional synchronous motor, excessive loading tends to produce a pull-out torque condition. With increasing load torque, the A.C.-D.C. motor of this invention tends to slow down rather than to continue running at the particular synchronous speed defined by its design characteristics. In accordance with the present invention, the frequency of the A.C. voltage applied to the armature is controlled in proportion to the speed of the rotor. Thus, upon an increase in load torque, the resulting deceleration of the rotor proportionally lowers the frequency of the A.C. voltage applied to the armature, and the machine then operates at some lower speed. However, at this lower speed, it maintains a true synchronous relation between the vectors $(-\overline{V})$ and $\overline{F}$.

Since, in accordance with the present invention, the vectors $(-\overline{V})$ and $\overline{F}$ are continuously maintained in a synchronous relation, the angle gamma defined therebetween remains fixed while the speed of the machine varies with changes in load. However, provision may be made for controlling the angle gamma either manually or automatically. This control may be related to load changes or to other demands. For example, the angle gamma may be changed as a technique for providing positive control over the speed of the motor. Speed control of the motor may be provided in other ways as well, as by varying the magnitude of the applied armature voltage $|-\overline{V}|$ or the magnitude of the field excitation $|\overline{F}|$ or both, and with or without change in the angle gamma ($\gamma$). This is to be distinguished from the case of a conventional synchronous motor wherein a change in the vector $\overline{F}$ results in a change in the angle gamma. In an A.C.-D.C. motor, in accordance with this invention, an increase in the D.C. field vector $\overline{F}$, absent any change in the angle gamma or magnitude of applied armature voltage $|-\overline{V}|$ causes the motor to increase in speed to achieve a new stable condition at a combined higher speed and higher torque and power requirement. Similarly, the magnitude of the applied armature voltage $|-\overline{V}|$, the angle gamma ($\gamma$) and the magnitude of $|\overline{F}|$ may be varied in some predetermined fashion for effecting the required speed control.

Thus, among the principal objects of the invention is the provision of control for an A.C.-D.C. dynamo electric machine such as a motor:

In which the input frequency to an A.C.-D.C. motor is governed by the rotor speed;

In which the angle gamma can be controlled, either manually or automatically, and without dependence upon the magnitude of the applied armature voltage $|-\overline{V}|$, the rotor speed, or the magnitude of the D.C. field vector $|\overline{F}|$;

In which the magnitude of the D.C. field excitation vector $|\overline{F}|$ can be governed independently of the magnitude of the applied armature voltage $|-\overline{V}|$ independently of the rotor speed and independently of the angle gamma;

In which the magnitudes of the vector $|\overline{F}|$, the applied armature voltage $|-\overline{V}|$, and the phase angle gamma can all be varied, either manually or automatically, to control motor speed as required, and such speed control may be effected independently of any change in the mechanical load torque;

In which, at a given speed of rotation, both power and torque can be changed as desired by regulation of the magnitudes of the vectors $|-\overline{V}|$ and $|\overline{F}|$, and of the angle gamma;

In which a controlled speed motor arrangement can be provided, which when subjected to a sudden large change in load torque, will not pull out of step but will adapt to assume a different synchronous speed;

In which high efficiency is exhibited at all speeds, and even under relatively high load torque;

In which power and efficiency are not sacrificed to gain speed control as in the case of an induction motor, but which, rather, maintains the advantages of both a D.C. machine and of a synchronous machine with respect to power and efficiency;

In which an A.C.-D.C. motor, via its accompanying frequency generator or changer, may receive its primary armature power from a D.C. power supply or from a polyphase A.C. power supply, and yet the A.C.-D.C. motor may provide mechanical torque at rotor stand-still, or at controlled speed in either a forward or a reverse direction of rotation, thereby acting completely as a controlled speed motor;

In which the number of phases in the armature winding of the A.C.-D.C. motor need not be related to the characteristics of the source of power;

In which an A.C.-D.C. motor utilizing a three-phase input may be equipped with a damper on the rotor so that, upon reversal of the phase sequence of the voltages applied to the polyphase armature windings, the motor will act temporarily as an induction motor with torque applied in the reverse direction, slowing down, stopping, and starting up in the reverse direction, where it can be pulled into synchronism and operate again as a synchronized A.C.-D.C. motor running now in the reverse direction; and In which an A.C.-D.C. motor may not only be speed controlled for one direction of rotation but may be reversed to rotate at a controlled speed in the other direction, with a brief period of induction motor action during the reversal.

Other objects and advantages of the invention will be apparent during the course of the following description.

In the accompanying drawings forming a part of this specification and in which like numerals are employed to designate like parts throughout the same:

FIG. 1 is a schematic view illustrating an A.C.-D.C. motor and control arrangement operating in accordance with the principles of this invention;

FIG. 1A is a perspective view of a unique speed sensing control having a control disc that cooperates with a normally revolving contact arm arrangement used with the motor for regulating the frequency of the phases of the A.C. voltages applied to the armature, normally done in accord with the speed of the rotor;

FIGS. 1B and 1C illustrate alternative control disc and contact arm arrangements for effecting two-cycle and four-cycle operation, respectively, of an A.C.-D.C. motor;

FIG. 1D is a diagram of the physical layout of an A.C.-D.C. motor relating the magnetomotive force space diagram with the armature windings, and showing those armature conductors in which contribution to generated voltage $|-\overline{E}_g|$ is at an instantaneous maximum, and also showing central coil side of conductor group that provides $\overline{A}$;

FIG. 1E is a composite diagram illustrating the voltage and current-time diagram for one armature phase winding of the A.C.-D.C. motor with the magnetomotive force space diagram superposed thereon as illustrated in dashed lines, with 90° spacing being provided between the $(\overline{R})$ and $(-\overline{E}_g)$ vectors in accordance with conventional procedures;

FIG. 2 is a detailed circuit diagram illustrating a typical motor and control arrangement in accordance with this invention;

FIG. 2D shows a typical wave form produced by the frequency control unit for energizing the A.C. armature windings;

FIG. 3 is a schematic circuit diagram illustrating a single-phase motor and control arrangement utilizing a bridge circuit type frequency generator;

Figure 2A:
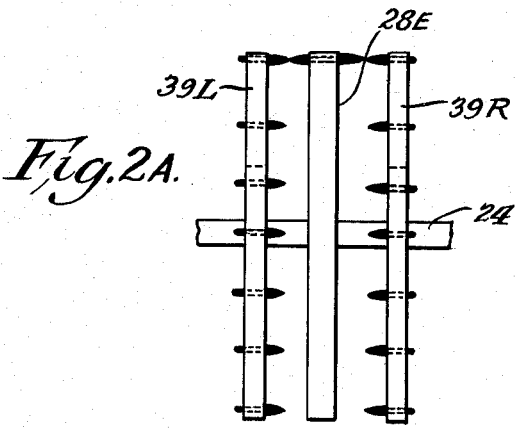
FIG. 2A is an enlarged side-elevational view of a multiple control disc and contact arm arrangement used in the arrangement of FIG. 2.
Figure 2B:
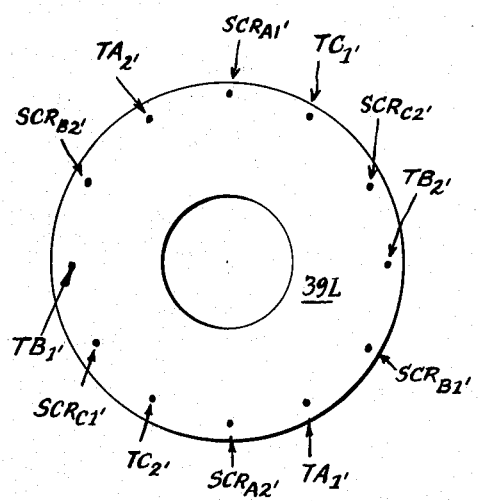
FIGS. 2B and 2C are face views of the left and right-hand control disc elements, respectively, shown in FIG. 2A.
Figure 2C:
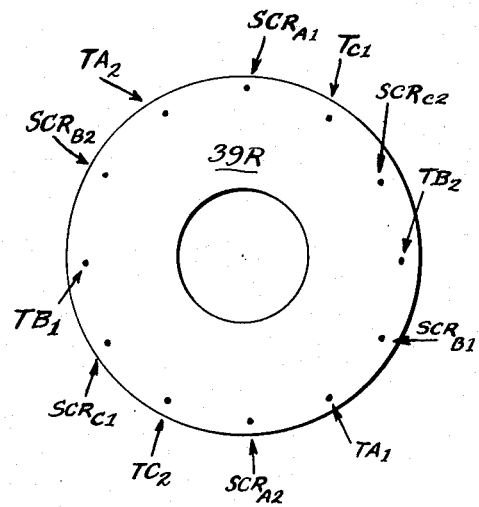
Figure 8:
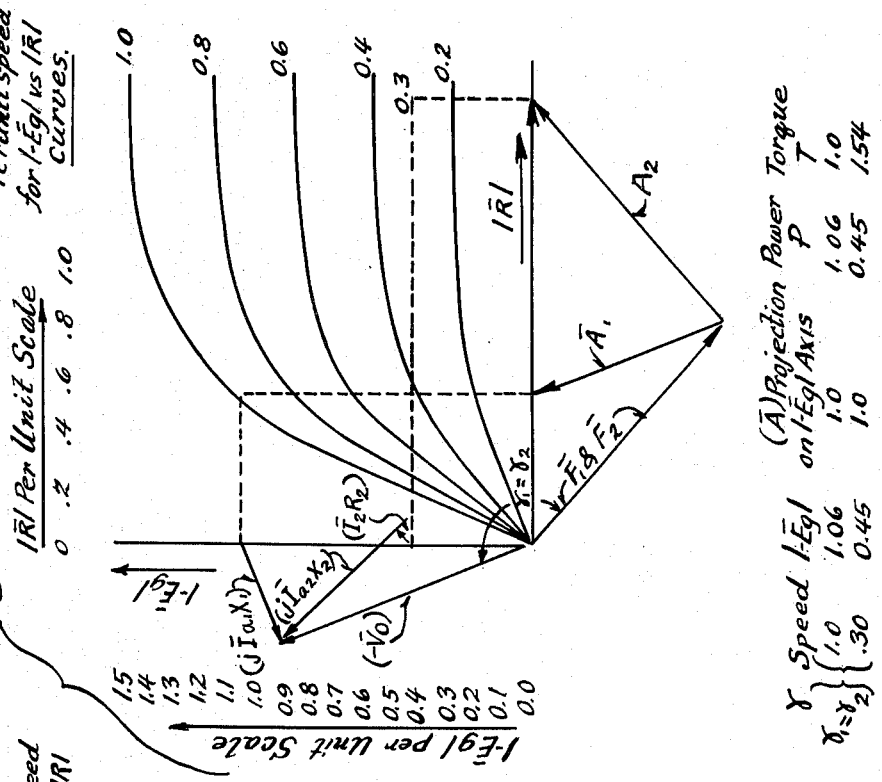
Figure 7:
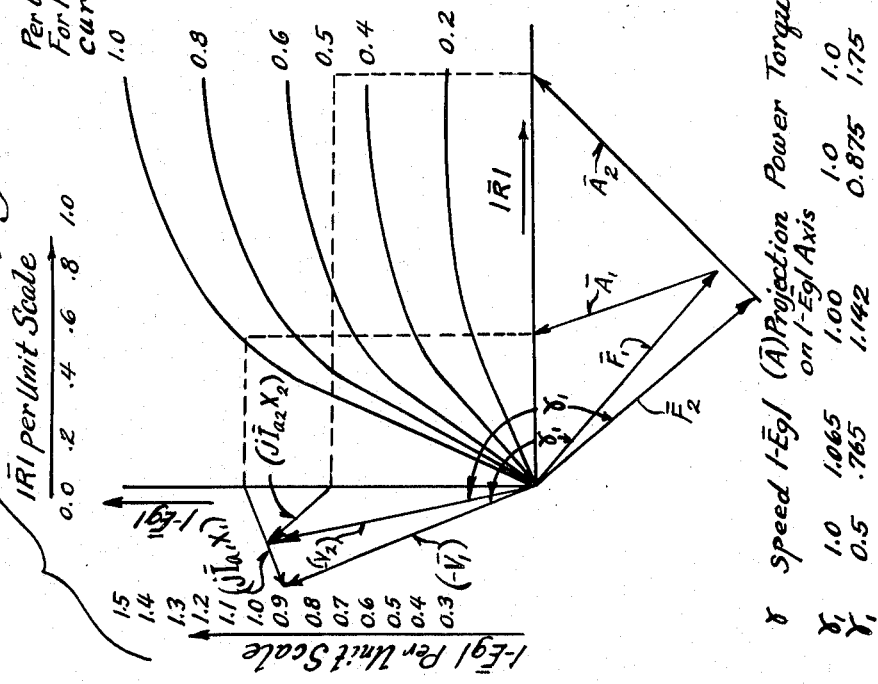

FIGS. 3A, 3B, and 3C are views of the control disc arrangement and correspond, respectively, to FIGS. 2A, 2B, and 2C;

FIG. 3D shows a typical wave form produced by the frequency control unit of FIG. 3;

FIG. 4 is a schematic circuit diagram corresponding to that of FIG. 3 but showing a three-phase bridge circuit arrangement;

FIGS. 4A and 4B are views of the control disc arrangement of FIG. 4 and correspond, respectively, to FIGS. 3B and 3C;

FIG. 5 is a vector diagram illustrating vector relationships at four different operating conditions corresponding to different ($\gamma-90°$) and all taken with $|-\overline{V}|$ and $|\overline{F}|$ constant and with per unit speed of 1.0;

FIGS. 5A and 5B are vector diagrams like that of FIG. 5 but taken with per unit speeds of 0.8 and 0.6, respectively;

FIGS. 5C and 5D are graphs of torque-speed curves derived from the data of FIGS. 5, 5A, and 5B;

FIG. 6 is a vector diagram illustrating two sets of vector relationships showing speed control obtained by varying voltage $(-\overline{V})$ directly with frequency; the two different sets corresponding to two different values of $\gamma$ with $|\overline{F}|$ being held constant;

FIG. 6A is a graph showing curves of torque vs. speed and power vs. speed derived from the two sets of conditions shown in FIG. 6;

FIG. 7 is a vector diagram illustrating speed control due to varying load while holding $\gamma$, $|-\overline{V}_1|$ and $|-\overline{F}|$ constant; and FIG. 8 is a vector diagram illustrating speed control due to varying impedance in circuit with lines 23A, 23B, and 23C between terminals of frequency generator and armature while holding $|-\overline{V}_0|$, $|\overline{F}|$, and $\gamma$ constant.

GENERAL DESCRIPTION

Referring now to the drawings, a motor and control arrangement is shown schematically and in block diagram form for illustrating the unique principles of operation and the flexibility of application of this invention. For purposes of illustrative disclosure, a dynamo electric machine construction like that of a conventional three-phase synchronous motor is shown at 20 in FIG. 1. The motor 20 has a stator frame 21 supporting an annular assembly of laminations 21L on which the usual armature field windings 22 are provided and connected in either single-phase or polyphase configuration. In the arrangement of FIG. 1, a three-phase configuration is contemplated and the energizing circuits for the armature windings are labeled 23A, 23B, and 23C. A rotor shaft 24 is shown journalled in end brackets 21F of the stator, and it is provided with a D.C. field magnet unit 24M which is here shown as being of the salient pole rotor type. In this disclosure the rotor is provided with externally energizable exciting windings 24W connected through slip rings 25 mounted on the rotor shaft. The invention is also applicable to permanent magnet type rotor arrangements and also to round rotor configurations.

A conventional motor constructed like that shown in FIG. 1 will operate at a synchronous speed that is directly proportional to the frequency applied to the armature windings and inversely proportional to the number of pairs of poles on the D.C. field magnet of the rotor. The polyphase voltage $(-\overline{V})$ applied to the armature windings causes a rotating M.M.F. field to be set up, and this is designated herein by the vector $\overline{A}$. Similarly, the rotation of the rotor provides a mechanically rotating magnetic field which is here designated by the vector $\overline{F}$. When a conventional synchronous motor is running at synchronous speed and without load, the vector $\overline{F}$ lags the vector $(-\overline{V})$ by a fixed angle gamma of just over 90°. When the motor is mechanically loaded and no change is made in the magnitudes $|-\overline{V}|$ and $|\overline{F}|$, then the rotor drops back in its relative position thereby increasing the angle of lag, gamma ($\gamma$). During the interval when the angle gamma is changing as the machine takes on load, the vectors $(-\overline{V})$ and $\overline{F}$ are not locked in truly synchronous relation. After synchronous speed is restored at some new angle gamma, and if the load is then kept constant, it is possible, by decreasing the rotor field strength vector $|\overline{F}|$, to cause the angle gamma to increase further. Alternatively, if the magnitude of the vector $|\overline{F}|$ were increased, then the angle gamma would decrease.

A motor control arrangement is provided in accordance with the present invention for causing the motor to maintain a true synchronous relationship between the vectors $(-\overline{V})$ and $\overline{F}$. This is accomplished by two concurrently important steps:

(1) Regulating the frequency applied to the armature coils in direct proportion to the rotor speed, and
(2) Controlling the angle gamma ($\gamma$).

Thus, if it is assumed that a motor is operating to drive a constant load at a constant speed thus maintaining a synchronous relation between the vectors $(-\overline{V})$ and $\overline{F}$, and it is then assumed that the load is suddenly increased, the motor's initial response, as is true of a conventional synchronous motor, is to begin to slow down. In accordance with this invention, the differential decrease in rotor speed is detected by speed sensing facilities 26 which are interconnected with and control a frequency generator unit 27 to cause the energizing circuits 23A, 23B, and 23C for the armature windings to be supplied with A.C. power at a proportionately decreased frequency, while at the same time controlling gamma either to maintain the same angle or to effect a change to some other operable value. Depending upon the applied load, and assuming no changes in $\gamma$ or $(-\overline{V})$, the motor continues to slow down until it finds a new stable speed of rotation, and the progressive slowdown of the rotor speed causes a progressively reduced frequency to be applied to the armature coils, so that the vectors $(-\overline{V})$ and $\overline{F}$ are held in synchronous relation at all times and without change in gamma ($\gamma$).

The frequency generating unit 27 shown in FIG. 1 is indicated as being fed below by leads 27a, 27b, and 27c, from a three-phase power supply, or power source, and the frequency generating unit acts to transform the input power into appropriate energizing power for the armature windings. The frequency of the power supplied to the armature windings is not dependent upon the frequency of the power source. In fact, the source of power may be D.C. or single-phase A.C. of any frequency, and this will only affect the details in the design of the frequency generating unit. The output frequency of this unit is regulated by the speed sensing facilities 26 that are responsive to the speed of the rotor.

Later, detailed steps will be taken to illustrate starting, stopping and reversing the controlled speed A.C.-D.C. motor of this present invention.

Pertinent background to an understanding of this invention is a discussion of the physical structure relative to vector diagrams. This leads to a proper concept of the problem and of $\gamma$.

FIGURE 1D shows the D.C. excited rotor 24R and a stationary armature 21. The rotor turns in the counterclockwise direction. The position of the magnetomotive force vectors relative to the poles are shown. Conductors are shown in which the conductor component internal voltage $|-\overline{E}_g|$ is at a maximum due to the maximum flux density $\overline{B}_m$ which is at this location. A conductor is shown with $\overline{I}_a$ and $\overline{A}$ vectors associated. This is where the strongest armature M.M.F. per inch of periphery could be considered to be located at the instant shown by this figure. The angle ($\gamma$—90°) is shown on the diagram.

FIGURE 1E should be thought of in conjunction with FIGURE 1D. It is the intention to excite the one phase so that $\gamma$ and ($\gamma$—90°), which are derivable on FIGURE 1E, will be given physically realizable form via FIGURE 1D.

In the arrangement illustrated in FIG. 1, the speed sensing facilities 26 comprise a rotary contact arm 28 and a normally stationary cooperating control disc 29 mounted on an end bell 21B carried by the stator bracket and frame, and disposed in encircling relation about the axis of the rotor shaft 24. The contact arm 28 is mounted upon an insulating bushing 30 carried rigidly on and revolving with the rotor shaft to progressively sweep across a series of contacts spaced progressively about the circumferentially adjustable control disc 29. A slip ring 31 mounted on the insulating bushing 30 serves to complete the circuit paths established through the revolving contact arm 28. A typical control disc contact layout is shown in FIG. 1A in which the slip ring arrangement provides a common entry to the contact arm and a single set of contacts are spaced uniformly about the control disc so that the frequency generating unit 27 undergoes a single cycle of operation during one complete revolution of the rotor shaft. For such an arrangement, the armature of the A.C.-D.C. machine is wound for two poles. The contacts on the stationary disc are connected to control circuit components contained in the frequency generating unit 27, and the rotation of the rotor causes the contact arm to activate these contacts in a predetermined sequence to energize the circuit components of the frequency generating unit 27 in a corresponding predetermined sequence and at a speed determined by the instantaneous speed of the rotor. Since the time at which the disc contacts are activated by the contact arm determines the angle gamma ($\gamma$) between the rotor field vector $\overline{F}$ and the armature vector $(-\overline{V})$, the angle gamma ($\gamma$) can be controlled by adjusting the angular position of the control disc 29 about the rotor axis.

An alternative control disc and contact arm arrangement is shown in FIG. 1B wherein the contact arm 28B spans the disc 29B diametrically so that the same two contacts are interconnected twice during each rotor revolution. Thus, the frequency generating unit 27 would undergo two cycles of operation for each rotor revolution. Consequently, the A.C.-D.C. machine would have its armature wound for four poles (or two poles per electrical cycle).

Still another control disc and contact arm arrangement is shown in FIG. 1C wherein the contact arm 28C has a right-angled configuration and the contacts on the control disc 29C are arranged in four identical sets spaced about the axis of rotation of the arm. Rotation of the shaft produces four cycles of operation of the frequency generating unit for each revolution of the rotor, and consequently the A.C.-D.C. machine would have its armature wound for eight poles.

Again, still another control disc arrangement is illustrated by FIGS. 2A through 2C. Here the contacts on the control disc are each designated by symbol and these are directly related in turn by symbol designations shown on the embodiment illustrated in FIG. 2. In fact, the activation for each designated location on FIG. 2D is accomplished via the corresponding contact designation of FIG. 2A through FIG. 2C.

The control disc attached to the stator of the A.C-D.C. machine is rotatable or adjustable in a circumferential direction. Change of position of the control disc, changes the angle gamma between the vector ($-\overline{V}$), the armature input voltage, and the vector $\overline{F}$, the rotor field vector. This change in gamma may be made slowly or rapidly and in any specified manner, as a function of time, and with the rotor at a standstill or turning in either direction. The angle $\gamma$ between the armature input voltage vector ($-\overline{V}$) and the rotor field vector $\overline{F}$ can be changed by repositioning the control disc, and thus its contacts with respect to the fixed reference point on the armature of the A.C.-D.C. machine. Moreover, these changes of position of the control disc may be accomplished with or without any other changes such as alteration of the armature voltage magnitude, load torque, field current, etc.

The torque across the air gap is related, among other things, to the angle $\gamma$ between the vectors ($-\overline{V}$) and $\overline{F}$. By adjusting the position of the control disc, the torque across the air gap of the A.C.-D.C. machine can be changed to compensate for changes in loading conditions and the speed of the A.C.-D.C. motor can be controlled. The adjustability of the torque across the air gap by positioning the disc is another important feature of the present invention.

The contact arm 28 is mounted on the rotor shaft 24. As the arm revolves with the shaft, the contacts on the arm make and break electrical circuits in a sequence depending upon the particular arrangement of the cooperating electrical contacts and at a rate determined by the speed of rotation of the rotor shaft and by the number of cooperating contacts and their arrangement.

In the foregoing discussions relating to FIGS. 1A, 1B and 1C, 2A, 2B and 2C, mechanical means for making electrical contacts to produce the actuating signals in the frequency generating unit have been shown and described. It is apparent that such mechanical contacts are not necessary and that various alternative procedures well known in the art may be employed. For most purposes, these alternative procedures are analogous in operation and provide results which are comparable to the results obtained with mechanical contacting systems.

Several examples of non-mechanical contacting systems will be described briefly below.

Inductively wound heads or magnetic pickups may be substituted for the contactors on the control disc and a permanent magnet may be revolved in place of the contactors on the revolving arm in a manner to actuate in sequence the pickup coils. Flux linkage, rather than rate of change of flux linkage, should be recognized by the pickup coils but this type of response is readily achieved by proper selection of circuit elements, as is well known. As still another alternative, capacitors may be used in place of the contactors of the control disc. And in place of the contactors on the revolving arm, a metallic element could be used to change the capacitance of the successive capacitors as the metal element revolves. The change of capacitance may be recognized by any one of several conventional procedures well known in the art, and the resulting information employed to actuate the frequency generator unit.

It should be recognized that in all cases the position of the contactor, magnetic pickup, capacitor pickup, etc. mounted on the adjustable control disc recognizes, in effect, not only the frequency of the cyclic signal but also the actual position of the rotor with respect to some reference point on the armature or stator. Moreover, the position of any of these particular sensing elements controls the frequency and, what is very important, also the angle between the voltage vector ($-\overline{V}$) and the field vector $\overline{F}$, or, as described earlier, the angle gamma.

In addition to the examples cited including electrical contact, magnetic pickups, capacitance pickups, etc., optical methods and means may be used for establishing information relating to rotor position and frequency.

In the particular preferred embodiment of the synchronous A.C.-D.C. machine described, the armature is a stationary member. An alternative arrangement is contemplated wherein a rotating armature operates in a stator mounted D.C. magnet field configuration. In this case, the control disc could again be fixed on the stator and provided with limited circumferential adjustment. The contact arm would then revolve with the armature. In this modified embodiment, slip rings or their equivalent are needed to bring power current to the rotating armature of the A.C.-D.C. machine.

THREE-PHASE MOTOR CONTROL

For purposes of illustrative disclosure, a specific embodiment of the invention is shown in FIG. 2, wherein the A.C.-D.C. machine is again represented as a motor 20 having its armature coils fed from a three-phase A.C. energizing circuit in the output of the frequency generating unit.

In the preferred embodiment of the invention, the frequency generator 27 is a stationary device in which not only the frequency can be controlled in relation to rotor speed, but in which the instant at which a given voltage lobe starts to be applied to a given armature coil can be determined and fixed at will. This feature is very important as it determines the control of the angle gamma ($\gamma$) between the vectors ($-\overline{V}$) and $\overline{F}$. Semi-conductor, electromagnetic or electrostatic elements can be used in a stationary type frequency generator, but in the arrangement of FIG. 2 semi-conductor elements are employed.

The input circuit to the frequency generating unit 27 is represented as a polyphase transformer 32 having a three-phase delta connected primary winding energized from a three-phase source of power and having its secondary arranged in a grounded double-Y or six-phase configuration, and connected to banks of rectifier circuits to convert the three-phase input to a positive D.C. voltage appearing on bus bar 33, and a negative D.C. voltage appearing on bus bar 34. In these circuits the elements $R_{a+}$, $R_{b+}$, $R_{c+}$, $R_{a-}$, $R_{b-}$, and $R_{c-}$ represent ordinary rectifiers, and the one having the greatest voltage applied is the one, and the only one, in a parallel group which is firing or conducting. The frequency controlling unit includes a separate frequency generator component for each phase of the armature voltage, and all are connected across the D.C. buses 33 and 34 to convert the D.C. power to A.C. power at a frequency and phase relationship determined by the contact arm and control disc arrangement of the speed sensing and gamma determining unit 36. Note that unit 36 is detailed in FIGS. 2A through 2C. The frequency generator circuits 37A, 37B and 37C are connected to be activated directly from contacts of the sensing and phase determining unit. The speed of rotation of the rotor determines the speed at which the contacts are activated, and hence determines the frequency derived from the frequency generator circuits. The position of the control disc establishes and controls the angle gamma ($\gamma$).

Each of the frequency generator circuits is identical in arrangement and operation and each utilizes controlled rectifiers for carrying the required power, with transistors being employed for controlling turn-off of the rectifiers.

In the A-phase frequency generator circuit 37A, elements ($SCR_{a1}$) and ($SCR_{a2}$) are controlled rectifiers that are excited to make them conducting, and each of these becomes non-conducting when the voltage across it is momentarily reversed. The devices ($T_{a1+}$) and ($T_{a1-}$) can be power transistors that are controlled separately and in proper sequence. However, they could be replaced by actual commutators or revolving switches.

The speed sensing unit 36 is shown in detail in FIGS. 2A, 2B and 2C. In this instance, two companion control discs 39L and 39R are normally stationarily mounted in axially spaced facing relation, and opposed contacts thereof are bridged by a revolving contact arm 28E that rides on the rotor shaft 24. This is evident from a comparison of the contact layout for the left-hand disc 39L of FIG. 2B with the contact layout for the right-hand disc of FIG. 2C. Thus, contact $SCR_{A1}$ on the right-hand disc 39R is connected to terminal $SCR_{A1}$ for the A-phase frequency generator circuit in FIG. 2, while contact $SCR_{A1}$, on the left-hand disc 39L is connected to the similarly designated terminal on the A-phase frequency generator circuit. Thus, when the rotating contact arm bridge contacts $SCR_{A1}$ and $SCR_{A1'}$ the silicon rectifier element ($SCR_{a1}$) is excited through its battery or controlling circuit to make it conducting and apply positive bus voltage to the A-phase energizing circuit 23A. About 150 mechanical degrees or 150 electrical degrees later, the rotating contact arm 28E bridges contacts $T_{A1}$ and $T_{A1'}$ to excite transistor ($T_{a1+}$) momentarily and draw current through an inductance $L_{A+}$ connected in its collector circuit to drop the voltage on the anode side of rectifier ($SCR_{a1}$) sufficiently to extinguish conduction therethrough. Thereafter, about 30 mechanical degrees or 30 electrical degrees later, the rotating contact arm 28E bridges contacts $SCR_{A2}$ and $SCR_{A2'}$ to excite the rectifier ($SCR_{a2}$) through its battery circuit and render it conducting to apply negative bus voltage to the A-phase energizing circuit 23A. After another 150 mechanical degrees or 150 electrical degrees, the rotating contact arm bridges contacts $T_{A2}$ and $T_{A2'}$, to excite transistor ($T_{a1}$) and momentarily draw current through inductance $L_{A-}$ connected in its emitter circuit to cause a voltage rise on the cathode side of rectifier ($SCR_{a2}$) and thereby extinguish it. The resultant voltage wave applied to the A-phase energizing circuit is shown at 40 in FIG. 2D.

It will be apparent from an examination of the layout of the contacts on the control discs and the correspondingly labeled terminals in the B and C-phase frequency generator components, that corresponding voltage waves will be applied to the B and C-phase energizing circuits with the proper phase relations to produce a rotating vector ($-\overline{V}$) due to current flow in the armature windings. This three-phase wave pattern will be produced once during each revolution of the contact arm.

The capacitor $C_{a1}$ in the circuit of transistor ($T_{a1+}$) and the capacitor $C_{a2}$ in the circuit of transistor ($T_{a1-}$) serve to increase the sharpness of the voltage change across rectifiers ($SCR_{a1}$) and ($SCR_{a2}$) when these rectifiers are to be rendered non-conducting. The resistance across the capacitors $C_{a1}$ and $C_{a2}$ drain off any charge accumulating thereon. The battery control circuits used to excite rectifiers $SCR_{a1}$ and $SCR_{a2}$ and transistors $T_{a1+}$ and $T_{a1-}$ should be suitably interlocked so that one rectifier cannot be excited unless the other is extinguished. For one procedure see FIGS. 2A, 2B and 2C. This will eliminate the danger of cross-conduction between the D.C. buses.

SINGLE-PHASE MOTOR CONTROL

A frequency generator 47 utilizing a bridge circuit 48 containing four power transistors ($T_1$), ($T_2$), ($T_3$) and ($T_4$) for switching the armature currents is incorporated in a single-phase motor control arrangement shown in FIG. 3. At present, the use of power transistors limits the power handling capabilities but further development of this art will extend the useful range. The bridge circuit has battery energized switching circuits having terminals $T_1$ and $T_{1'}$, $T_2$ and $T_{2'}$, $T_3$ and $T_{3'}$ and $T_4$ and $T_{4'}$ interconnected with a speed sensing and gamma determining unit 49 that is associated with the motor shaft and that comprises a revolving contact arm 50 mounted on the shaft for current bridging contacting relation between right and left-hand control discs 51 and 52, respectively. Control disc 52 has a contact layout shown in FIG. 3B and its contacts $T_{1'}$, $T_{2'}$, $T_{3'}$, and $T_{4'}$, are connected to the correspondingly designated terminals in the bridge circuit 48. Control disc 51 has a contact layout shown in FIG. 3C and its contacts $T_1$, $T_2$, and $T_3$, and $T_4$ are connected to the correspondingly designated terminals in the bridge circuit. The sequential operation of the bridge circuit under the control of the revolving contact arm and control disc arrangement applies a voltage waveform 53 (see FIG. 3D) to the armature winding of the motor 54.

As indicated in block diagram in FIG. 4, three such bridge circuits 48A, 48B and 48C may be similarly connected to and controlled by a control disc and revolving contact arm arrangement for providing control of a three-phase A.C.-D.C. motor. Face views of the left-hand and right-hand control discs 55 and 56 are shown in FIGS. 4A and 4B, respectively. On each disc the outer ring of contacts are connected to corresponding terminals in the A-phase bridge, the center ring of contacts are connected to corresponding terminals in the B-phase bridge and the inner ring of contacts are connected to corresponding terminals in the C-phase bridge. The embodiment of FIG. 4 functions like that of FIG. 2 as respects control of the motor.

Other frequency generators related to those already shown in the control system of this invention are described in the following references, but none is well suited for use in the present invention:

(1) Controlled Rectifier Inverter Circuits, General Electric Corporation Designers Guide, Semiconductor Products Department, Booklet No. ECG-425. (This device is more load dependent than those of the present invention.)

(2) A. Stranghen, P. P. Biringer, G. R. Slemon, Three Plate Induction Motor Control Using Static Frequency Doublers, AIEE Trans., Pt. II, Vol. 77, No. 36, pp. 58–66, May 1958. (This is essentially a fixed frequency device and hence not readily usable in the present invention.)

(3) George W. Dick, "Symmetrical Frequency Multipliers," AIEE Trans., Pt. I, pp. 125–134, May 1960. (This device seems to have the same limitations as reference 2.)

(4) German Patent No. 350,972, K. Schmidt, inventor. (This German invention appears to have essentially the same limitations as does reference 2.)

The present invention is concerned to a large extent, with the speed control of the A.C.-D.C. motor. Thus far, in the discussion of the theory, primary attention has been given to motor performance where the applied voltage $|-\overline{V}|$ to the armature was of a single magnitude and independent of changes in the frequency of the power supply voltage. The motor was assumed to be running and to be driving a mechanical load of either fixed or variable torque requirement, while, at the same time, either fixed or variable speed control was achieved by varying the angle $\gamma$ or the field excitation $|\overline{F}|$, or both.

Ways to vary and to control the speed of the A.C.-D.C. motor will be further detailed at this juncture. The magnitude of the input armature voltage provided by the frequency multiplier can be varied alone or can be varied concurrently with variations or adjustments of $|\gamma|$ or of $|\overline{F}|$ or of both.

FIGURES 5, 5A, and 5B each provide four vector diagrams for the per unit speed shown, and throughout these figures the same magnitudes for the applied voltage $|-\overline{V}|$ and the same magnitudes of D.C. field magnetomotive force vectors $|\overline{F}|$ are employed, while the angle $\gamma$ is varied and the resulting load is varied. FIGURE 5 applies for a speed of 1.0 per unit, FIGURE 5A for a speed of 0.8 per unit, and FIGURE 5B for a speed of 0.6 per unit.

The curves and data shown in FIGURES 5, 5A and 5B are employed in developing the data for FIGURES 5C and 5D. The last named figure shows torque-speed curves for the A.C.-D.C. motor over a per unit speed range of 1.0 down to 0.6, and each of these is quite similar in appearance to part of the single torque-speed curve of a D.C. series motor. On the A.C.-D.C. motor under discussion, it will be observed that a change in $\gamma$, which can be quickly achieved, shifts performance from one curve to another. Furthermore, if $|-\overline{V}|$ is held constant and $|\overline{F}|$ changed, still another set of curves can be obtained by again varying $\gamma$.

Not much has been said as yet about changes in $|-\overline{V}|$. These latter changes are particularly valuable in extending the speed control range further into the lower speed ranges. These latter possibilities will be further explained in the discussion on starting, stopping, and reversing the A.C.-D.C. motor, which is to follow.

An illustration will be provided, now, to show what may be achieved by varying the magnitude of the voltage $|-\overline{V}|$ delivered by the frequency multiplier. For convenience only, in the following discussion, suppose that $|-\overline{V}|$ varies directly with the frequency. It will be observed, again, that the ohmic value of the armature leakage reactance also varies directly with the frequency. Consequently, if $\gamma$ and $|\overline{F}|$ are held constant, the vector armature current and the vector armature demagnetizing ampere turns $(\overline{A})$ all remain fixed, then the vector diagram, including the effect of iron saturation, are illustrated by two separate examples in FIGURE 6, one for the value of $\gamma=\gamma_1$, and one for $\gamma=\gamma_2$, as shown therein. FIGURE 6A shows two sets of per unit values for several quantities as taken from FIGURE 6. In FIGURE 6A one set of the said values corresponds to $\gamma=\gamma_1$, and the other set to $\gamma=\gamma_2$. For a given $\gamma$, say $\gamma=\gamma_1$, once a compatible set of values for the vectors $(-\overline{V})$, $\overline{F}$, $\overline{A}$, and $(j\overline{I}aX)$ are found, it is easy to see how, in FIGURE 6, as $|-\overline{V}|$ decreases with frequency and vector $(\overline{A})$ remains unchanged, that a continuing compatible set of values can be found as frequency changes.

It remains to be explained how the first such compatible set of vectors can be established. This can be done graphically in the following manner. Assume that the curve $|-\overline{E}_g|$ vs. $|\overline{R}|$ is known for the per unit speed (1.0). Choose: (1) The vector $\overline{F}$; (2) the projection of $\overline{A}$ on the axis of $|-\overline{E}_g|$, and hence the angle between $\overline{F}$ and $\overline{R}$; and (3) the magnitude only of $(-\overline{V})$. For the moment, leave the angle $\gamma$ as unknown. It will be observed that $|j\overline{I}aX|$ at a given frequency is proportional to $|\overline{A}|$ and that the two vectors $(j\overline{I}aX)$ and $\overline{A}$ stand at right angles to one another. Since the projection of $\overline{A}$ on the axis of $|-\overline{E}_g|$ was fixed by assumption, it follows that the projection of $(j\overline{I}aX)$ on the axis of $|\overline{R}|$ remains fixed. Recalling that $|-\overline{V}|$ is fixed, the intersection of $(j\overline{I}aX)$ and $(-\overline{V})$ as vectors is determined. At a given frequency, say 1.0 per unit, the diagram also provides that $|j\overline{I}aX|$ and $|\overline{A}|$ remain in a constant numerical ratio. The one pair of vector values for $(j\overline{I}aX)$ and $\overline{A}$ which yield the single compatible point on the curve of $|-\overline{E}_g|$ vs. $|\overline{R}|$ for unity per unit speed, now can be found. Thus, not only has $\gamma=\gamma_1$ been found, but the power factor angle between $\overline{A}$ and $(\overline{V})$ has been established for the single frequency condition which is being assumed at this instant. It will be observed that, in FIGURE 6, the power factor angle between $\overline{A}$ and $(\overline{V})$, the angle $\gamma=\gamma_1$, $(\overline{F})$, $(\overline{A})$ and $(\overline{I}a)$ all remain fixed for the particular case therein described. However, FIGURES 6 and 6A show calculations for an example where $\gamma=\gamma_1$, and where $\gamma=\gamma_2$. It will be observed however, that the absolute values of the applied armature voltages remain equal, that is $|-\overline{V}_1|=|-\overline{V}_2|$; and, at the same time, the absolute values of the field excitation vectors remain equal, that is $|\overline{F}_1|=|\overline{F}_2|$ for the examples of FIGURES 6 and 6A.

It becomes clear from the foregoing discussion of FIGURES 6 and 6A how control of $|-\overline{V}|$ can be employed along with control of $|\overline{F}|$ and of $\gamma$ for the control of the speed-torque and speed-power curves of the A.C.-D.C. motor.

Next, the problem of starting, stopping and reversing direction of rotation will be discussed in relation to FIGURES 6 and 6A, and in the light of the immediately previous discussion. It is seen that, with the ratio of $|-\overline{V}|$ to frequency fixed at some specific value, and with $|\overline{F}|$ fixed, then the torque varies with $\gamma$, while the power factor for the armature remains substantially unchanged. As $\gamma$ becomes further and further reduced, the motor torque can change to generator torque. In this, the phase sequence for the armature remains unchanged. If the frequency generator can receive, as well as deliver power, dynamic braking results from such generator action. However, with or without dynamic braking, the motor is mechanically loaded, can come down to a stop. It can be started again in the original direction by again increasing $\gamma$. However, from the standstill condition it can be started up in the opposite direction of rotation by carrying out three actions as follows: (1) Reverse the actuation or control sequence, and hence the phase sequence of the frequency generator device; (2) change the angle $\gamma$ to that value which, when measured for the reverse direction of vector rotation, is the one desired for motor operation in the reverse mechanical direction; and (3) applying voltage $|-\overline{V}|$.

The foregoing presents basic principles for varying $|-\overline{V}|$ in methods of speed control, and methods for stopping, starting and reversing the A.C.-D.C. dynamo. Suppose now, that $|-\overline{V}|$ is to be held constant, and hence not varying with frequency. Suppose, also that $|\overline{F}|$, and $\gamma$ are to be held constant but, in all of this, load torque may increase. Refer now to FIGURE 7, where $(-\overline{V}_1)$, $(j\overline{I}a_1X)$, $\overline{F}_1$ and $\overline{A}_1$ and the angle $\gamma_1$ all are identical to the corresponding values of FIGURE 6 for the same A.C.-D.C. dynamo. A second operating condition is illustrated in FIGURE 7 by vectors $(-\overline{V}_2)$, $\overline{F}_2$ and $\overline{A}_2$ and $\gamma=\gamma_1$ remains the same angle in magnitude. It is seen that, when compared with the first condition, this second condition results in a substantial increase in armature current magnitude in the numerical ratio of $$\{|\overline{A}_2|/|\overline{A}_1|\}$$

The armature ohmic leakage reactance has been reduced in the ratio of the frequencies, and hence of rotor speeds. The speed for the first example in FIGURE 7 is (1.0) per unit, and in the second the speed is (0.50) per unit. The power factor angle for the second example of this figure is much different from that of the first example; obviously, further decrease in speed resulting from a continuing increase in load torque will, under this presently described mode of operation, result in extremely high magnitudes of armature current and increasingly poorer power factors with the risk, or perhaps certainty of overheating the armature winding. A further consideration of FIGURE 7 suggests that if $|-\overline{V}|$ is held constant, a simple reduction of $\gamma$ will not serve well to reduce speed to values near zero because as speed reduces $(j\overline{I}aX)$ does not come down as would be desired. The ohmic value of reactance $(jX)$ approaches zero as speed approaches zero.

Still another procedure for speed change will be discussed and it will be illustrated by means of FIGURE 8.

In this latter figure, start again with vectors $(-\overline{V}_1)$, $(j\overline{I}a_1X)$, $\overline{F}_1$, $\overline{A}_1$, and the angle $\gamma=\gamma_1$ which correspond to the first examples of FIGURES 6 and 7 for the same A.C.-D.C. machine. In FIGURE 8 it will be assumed while $|-\overline{V}_1|$ is held constant as speed is decreased, that an increasing impedance is located between the terminal voltage $(-\overline{V})$ of the frequency generator and the motor terminal voltage. Both can be balanced polyphase voltages. Examples 1 and 2 of FIGURE 8 are characterized as before by subscripts 1 and 2. It is seen that whereas in FIGURE 7 the per unit speed came down from (1.0) per unit to (0.5) per unit, a slightly less increase in armature current; for example, 2 of FIGURE 8 yields a speed of (0.3) per unit. However, since ohmic reactance disappears as frequency and as motor speed goes to zero, the external impedance would have to become resistance to bring motor speed far down toward zero speed.

Another procedure for speed control will be presented which is particularly applicable to stopping, starting and reversing rotation of the machine. Its application is particularly useful for the lower speeds, though it can be used at all speeds. Actually, this method at the lower speeds calls for operation of the rotating machine as an induction motor. This is quite analogous to the use of a damper winding for starting a conventional synchronous motor. Up to this point, no discussion of a secondary or damper winding has been presented. Assume, now that the A.C.-D.C. dynamo is provided with either a squirrel cage or a wound secondary winding, and, in either event, that this secondary winding is mounted in the poles of the D.C. field. Then, by removing the control of the frequency generator from the connections on the rotatable disc, and connecting such controls to a separately operated oscillator of controlled frequency, the frequency and phase sequence of the output voltage of the frequency generator can be controlled. The magnitude of the output voltage of the frequency control device might, in certain instances, also be controlled. Hence, the A.C.-D.C. dynamo becomes, during starting, stopping and reversal, an induction motor of controlled frequency and possibly also controlled voltage magnitude input. Stopping and reversal can be hastened by reversal of the armature phase sequence. When a sufficient speed is attained in either the forward or reverse direction of rotation, the controls for the frequency and phase sequence of the frequency multiplier can be switched over to the connections on the rotatable control disc so that A.C.-D.C. motor operation is resumed. In so doing, an appropriate value of $|\overline{F}|$ and of $\gamma$ should be switched in when A.C.-D.C. motor operation in a given direction is to be initiated so that a sudden and undesired speed change will not occur before $\gamma$, and $|\overline{F}|$, and also $|-\overline{V}|$ can be readjusted as needed to give the desired speed.

SYMBOLS AND DEFINITIONS

Throughout this theoretical discussion, the round rotor theory has been relied upon rather than the two reaction synchronous motor theory. This has been done strictly to simplify the presentation. It will be apparent to those skilled in the art that there is nothing to prevent the employment of the two reaction synchronous motor theory in order to take into full account the salient pole effect. For further presentations of synchronous motor theory and the relation of this theory to synchronous generator theory, reference can be made to chapter 21, pages 304 through 323 of the text "Principles of Alternating-Current Machinery," by Ralph R. Lawrence, revised by Henry E. Richards, fourth edition, published by McGraw-Hill Book Company, Inc., 1953.

The symbols follow for the A.C.-D.C. dynamo, both for generator and motor action.

(1) Voltages and E.M.F.'s in vector form, (a) for generator action on a per phase basis:

$\overline{V}$=vector for output load voltage rise
$\overline{E}_g$=vector for internal generated voltage per phase
$j\overline{I}aX$=vector for internal leakage reactance voltage drop
$j\overline{I}aX \cong \overline{I}Z$ except at low frequencies
$\overline{E}_g=\overline{V}+\overline{I}aZ$
$\overline{E}_g \cong \overline{V}+j\overline{I}aX$, or, in less usual form
$(-\overline{V})=(-\overline{E}_g)+\overline{I}aZ$ (b) For motor action per phase:

$(-\overline{V})$=vector for applied line voltage
$(-\overline{E}_g)$=vector for internal E.M.F. due to air gap flux opposing $(-\overline{V})$
$(\overline{I}aZ)$=vector for internal leakage reactance voltage drop
$(\overline{I}aZ) \cong (j\overline{I}aX)$ except at quite low frequencies
$(-\overline{V})=(-\overline{E}_g)+\overline{I}aZ$
$(-V) \cong (-\overline{E}_g)+j\overline{I}aX$ The last equation is frequently used in graphical form in the figures used to illustrate this invention.

(2) Currents and magnetomotive forces:

$\overline{I}a$=vector for armature current per phase
$I_f$=field current per pole
$\overline{A}$=vector for armature reaction in ampere turns per pole
$\overline{F}$=vector for field excitation or field magnetomotive force per pole, the magnitude which is proportional to $I_f$
$\overline{R}=\overline{F}+\overline{A}$=vector for the resultant air gap ampere turns On a per unit basis $\overline{A}$ and $\overline{I}a$ can be used interchangeably.

(3) Impedance and Impedance Drops:

$X$=armature leakage reactance per phase in ohms
$Ra$=armature resistance per phase in ohms
$\overline{Z}=(Ra+jX)$=armature impedance in ohms and a vector-like operator
$j\overline{I}aX$=armature leakage reactance drop per phase and a vector
$\overline{I}aZ \cong j\overline{I}aX$ except for very low frequencies (4) Angles and frequencies:

$f$=frequency for armature current and voltage
$\omega=2\pi f$
$\theta$=power factor angle=angle between $(-\overline{V})$ and $\overline{A}$ or $(-\overline{V})$ and $\overline{I}a$
$\gamma$=angle between $(\overline{F})$ and $(-\overline{V})$ and is controlled in this invention
$(\gamma-90°)$=an angle used on occasions in illustrating performance (5) An important definition:

The terms "frequency multiplier," "frequency generator," and "frequency changer" can be used interchangeably in the subject and in the body of this disclosure. In every instance, these terms refer to a device, examples of which are described in the body of this invention. This device is one which may receive power from a single phase, or from a polyphase A.C. supply, or from a D.C. power supply. However, regardless of what the power supply may be, the device is one which can deliver power at controlled frequency. This frequency can be controlled externally; however, in normal A.C.-D.C. motor operation, except at low speeds and during reversal, frequency is controlled by the speed of the rotor of the A.C.-D.C. motor. Further, and this is important, not only is the frequency to the armature controlled by rotor speed but the angle gamma $(\gamma)$ is controlled by disc position and it can be adjusted as desired automatically or manually in a prescribed manner.

What is claimed is:

1. In combination, an A.C.-D.C. dynamo electric motor having relatively rotatable rotor and stator members, defining an air gap therebetween, one of said members being an armature having a plurality of A.C. windings distributed thereabout and the other of said members having a D.C. pole configuration mounted thereon in cooperable relation with said armature windings for torque and energy exchange across said air gap upon relative rotation of said members, and motor control mechanism comprising a set of sense elements mounted on said stator in spaced relation around the axis of rotation of the rotor, an actuating arm on said rotor and revolvable therewith to actuate said sense elements in sequence to produce from each sense element a pulse-like control signal, and a frequency generator unit having a D.C. power input circuit, power transforming circuitry connected to said input circuit and connected to apply A.C. voltage to said armature windings and control circuitry responsive to control signals from said sense elements and connected to said power transforming circuitry to regulate the frequency and phase of the A.C. voltage, said control circuitry having control elements operable in sequence by control signals from said sense elements in accordance with rotor speed and angular position to supply said A.C. voltage with a waveform that is substantially full wave and that has a dominant fundamental frequency that is a constant integer multiple of rotor speed and that has a predetermined time phase with respect to instantaneous angular position of the rotor.

2. In combination, an A.C.-D.C. dynamo electric motor having relatively rotatable rotor and stator members defining an air gap therebetween, one of said members being an armature having a plurality of A.C. windings distributed thereabout and the other of said members having a D.C. pole configuration mounted thereon in cooperable relation with said armature windings for torque and energy exchange across said air gap upon relative rotation of said members, and motor control mechanism including first and second cooperable means revolving relative to each other at a speed determined by and directly proportional to the rotor speed, said first means comprising a set of sense elements mounted in predetermined angular reference position relative to one of said members, and said second means comprising an actuating arm mounted in predetermined angular reference position relative to the other of said members to produce from each sense element a pulse-like control signal, and a frequency generator unit having a D.C. power input circuit, power transforming circuitry connected to said input circuit and connected to apply A.C. voltage to said armature windings and control circuitry responsive to control signals from said sense elements and connected to said power transforming circuitry to regulate the frequency and phase of the A.C. voltage, said control circuitry having control elements responsive to said first and second cooperable means to operate in sequence, in accordance with the reference positions of said sense elements and said actuating arm and in accordance with rotor speed and angular position relative to said stator, to supply said A.C. voltage with a waveform that is substantially full wave and that has a dominant fundamental frequency that is a constant integer multiple of rotor speed and that has a predetermined time phase with respect to instantaneous angular position of the rotor.

3. In combination, an A.C.-D.C. dynamo electric motor having relatively rotatable rotor and stator members defining an air gap therebetween, one of said members being an armature having a plurality of A.C. windings distributed thereabout and the other of said members having a D.C. pole configuration mounted thereon in cooperable relation with said armature windings for torque and energy exchange across said air gap upon relative rotation of said members, and motor control mechanism including first and second cooperable means revolving relative to each other at a speed determined by and directly proportional to the rotor speed, said first means comprising a set of sense elements mounted in predetermined angular reference position relative to one of said members, and said second means comprising an actuating arm mounted in predetermined angular reference position relative to the other of said members, and a power supplying frequency generating unit having positive and negative D.C. power supplying buses, a separate frequency generator component for each armature winding and having positive lobe and negative lobe unidirectional power transmitting circuits connected from said positive and negative buses, respectively, and each connected to the corresponding phase of the armature winding, each said power transmitting circuit having a pair of circuit elements, each pair of circuit elements being comprised of a turn-on flow controlling circuit element and a turn-off flow controlling circuit element, each pair of circuit elements being responsive to a corresponding pair of said sense elements to enable relative rotation of said rotor and stator members to actuate said sense elements in a predetermined relationship to effect application to the corresponding phase of the armature winding of a substantially full wave A.C. voltage having a dominant fundamental frequency having a value that is a constant integer multiple of rotor speed and having a time phase that is in a predetermined relationship to instantaneous angular position of the rotor in accordance with the relationship between said set of sense elements and said actuating arm, with said motor combination having a group of externally variable performance factors, said group comprising a field excitation magnitude factor determined by said D.C. pole configuration, an applied armature A.C. voltage magnitude factor determined by said power supply circuitry, and a phase angle factor representative of the relation between an applied armature A.C. voltage vector and a field excitation vector, and means for varying at least one of said factors.

4. In combination, an A.C.-D.C.- dynamo electric motor having relatively rotatable rotor and stator members, defining an air gap therebetween, one of said members being an armature having a plurality of A.C. windings distributed thereabout and the other of said members having a D.C. pole configuration mounted thereon in cooperable relation with said armature windings for torque and energy exchange across said air gap upon relative rotation of said members, and motor control mechanism including first and second cooperable means reacting relative to each other at a rate and instantaneous timing determining by and directly proportional to rotor speed and position with respect to the stator, said first means including at least one sense element mounted in predetermined angular reference position relative to one of said members and an actuator element mounted in predetermined angular reference position relative to the other of said members, and a power supplying frequency generating unit having a D.C. power input circuit, and a separate electrical power transforming frequency generator component corresponding to each armature winding and connected to receive input power from said input circuit and to supply output power to said corresponding armature winding, each said component having flow controlling circuit portions to initiate turn-on and turn-off of such component, and means connecting separate ones of said sense elements to apply, in response to actuation thereof by said arm, low power momentary control signals to corresponding ones of said circuit portions to effect turn-on and turn-off of such component in accordance with rotor speed and angular position to apply to said corresponding armature winding a substantially full wave A.C. voltage waveform having a dominant fundamental frequency component that is a constant integer multiple of rotor speed and that has a predetermined time phase with respect to instantaneous angular position of the rotor.

5. In combination, an A.C.-D.C. dynamo electric motor including a stator having a plurality of armature windings distributed about its periphery, and a rotor disposed in said stator to define an air gap therebetween, said rotor having a D.C. pole configuration in cooperable relation with said armature windings for torque and energy exchange across said air gap upon relative rotation of said stator and rotor, and motor control mechanism comprising means for producing a separate control signal at each of a plurality of predetermined relative angular positions of said rotor and stator, a power supplying frequency generating unit having positive and negative D.C. power supplying buses, a separate frequency generator component for each armature winding and having positive lobe and negative lobe unidirectional power transmitting circuits connected from said positive and negative buses, respectively, and each connected to the corresponding phase of the armature winding, each said power transmitting circuit having a pair of circuit elements, each pair of circuit elements being comprised of a turn-on flow controlling circuit element and a turn-off flow controlling circuit element, each pair of circuit elements being responsive to control signals from a corresponding pair of said locations to enable relative rotation of said rotor and stator to actuate said circuit elements in a predetermined relationship to effect application to the corresponding phase of the armature winding of a substantially full wave A.C. voltage waveform having a dominant fundamental frequency component that is a constant integer multiple of rotor speed and that has a predetermined time phase with respect to instantaneous angular position of the rotor.

6. In combination, an A.C.-D.C. dynamo electric motor including a stator having a plurality of armature windings distributed about its periphery, and a rotor disposed in said stator to define an air gap therebetween, said rotor having a D.C. pole configuration having separately energized D.C. field windings and disposed in cooperable relation with said armature windings for torque and energy exchange across said air gap upon relative rotation of said stator and rotor, said rotor also having an induction motor secondary winding disposed thereon for energy exchanging relation with said armature windings upon relative rotation of said motor and stator, selectively operable means for disabling said D.C. field windings and for enabling said induction motor secondary winding during motor starting and stopping operations, and motor control mechanism comprising means for producing a separate control signal at each of a plurality of predetermined relative angular positions of said stator and rotor, a power supplying frequency generating unit having a D.C. power input circuit and a separate electrical power transforming frequency generator component corresponding to each armature winding and connected to receive input power from said input circuit and to supply output power to said corresponding armature winding, each said component having flow controlling circuit portions to initiate turn-on and turn-off of such component, and means connecting control signals from separate ones of said locations to corresponding ones of said circuit portions to effect turn-on and turn-off of such component in accordance with rotor speed and angular position to apply to said corresponding armature winding a substantially full wave A.C. voltage waveform having a dominant fundamental frequency component that is a constant integer multiple of rotor speed and that has a predetermined time phase with respect to instantaneous angular position of the rotor.

7. The combination of claim 6 and including means for controlling starting, stopping and reversing of said motor through induction motor action, said means including means for reversing the phase sequence of the A.C. voltage applied to said armature windings to reverse the direction of rotation of the armature produced M.M.F. vector, a separate source of oscillations, and means for transferring control of said frequency generator unit from said sensing means to said separate source of oscillations.

8. In combination, an A.C.-D.C. dynamo electric motor including a stator having a plurality of armature windings distributed about its periphery, and a rotor disposed in said stator to define an air gap therebetween, said rotor having a D.C. pole configuration having separately energized D.C. field windings and disposed in cooperable relation with said armature windings for torque and energy exchange across said air gap upon relative rotation of said stator and rotor, said rotor also having an induction motor secondary winding disposed thereon for energy exchanging relation with said armature windings upon relative rotation of said motor and stator, selectively operable means for disabling said D.C. field windings and for enabling said induction motor secondary winding during motor, starting and stopping operations, and motor control mechanism comprising means for producing a separate control signal at each of a plurality of predetermined relative angular positions of said rotor and stator, a power supplying frequency generating unit having positive and negative D.C. power supplying buses, a separate frequency generator component for each armature winding and having positive lobe and negative lobe unidirectional power transmitting circuits connected from said positive and negative buses, respectively, and each connected to the corresponding phase of the armature winding, each said power transmitting circuit having a pair of circuit elements, each pair of circuit elements being comprised of a turn-on flow controlling circuit element and a turn-off flow controlling circuit element, each pair of circuit elements being responsive to control signals from a corresponding pair of said locations to enable relative rotation of said rotor and stator to actuate said circuit elements in a predetermined relationship to effect application to the corresponding phase of the armature winding of a substantially full wave A.C. voltage waveform having a dominant fundamental frequency component that is a constant integer multiple of rotor speed and that has a predetermined time phase with respect to instantaneous angular position of the rotor, with said motor combination having a group of externally variable performance factors, said group comprising a field excitation magnitude factor determined by said D.C. pole configuration, an applied armature A.C. voltage magnitude factor, and a phase angle factor representative of the relation between an applied armature A.C. voltage vector and a field excitation vector, and means for varying at least one of said factors.

9. The combination of claim 8 and including means for controlling starting, stopping and reversing of said motor through induction motor action, said means including means for reversing the phase sequence of the A.C. voltage applied to said armature windings to reverse the direction of rotation of the armature produced M.M.F. vector, a separate source of oscillations, and means for transferring control of said frequency generator unit from said sensing means to said separate source of oscillations.

10. A combination recited in claim 5 and wherein said combination has a group of externally variable performance factors, said group comprising a field excitation magnitude factor determined by said D.C. pole configuration, an applied armature A.C. voltage magnitude factor, and a phase angle factor representative of the relation between an applied armature A.C. voltage vector and a field excitation vector, and means for varying at least one of said factors.

11. A control for a motor structure of a conventional synchronous type, wherein a peripherally distributed armature winding unit cooperates with a peripherally distributed D.C. pole configuration unit to define an air gap therebetween, said units providing torque and energy exchange across said air gap during relative rotation therebetween, said control comprising means for producing a separate control signal at each of a plurality of predetermined relative angular positions of said units, a power supplying frequency generating unit having positive and negative D.C. power supplying buses, a separate frequency generator component for each armature winding and having positive lobe and negative lobe unidirectional power transmitting circuits connected from said positive and negative buses respectively, and each connected to the corresponding phase of the armature winding, each said power transmitting circuit having a pair of circuit elements, each pair of circuit elements being comprised of a turn-on flow controlling circuit element and a turn-off flow controlling circuit element, each pair of circuit elements being responsive to control signals from a corresponding pair of said locations to enable relative rotation of said units to actuate said circuit elements in a predetermined relationship to effect application to the corresponding phase of the armature winding of a substantially full wave A.C. voltage waveform having a dominant fundamental frequency component that is a constant integer multiple of angular speed and that has a predetermined time phase with respect to instantaneous angular position of said units.

12. A control for a motor structure of a conventional synchronous type, wherein a peripherally distributed armature winding unit cooperates with a peripherally distributed D.C. pole configuration unit to define an air gap therebetween, said units providing torque and energy exchange across said air gap during relative rotation therebetween, said control comprising means for producing a separate control signal at each of a plurality of predetermined relative angular positions of said units, a power supplying frequency generating unit having a D.C. power input circuit and a separate electrical power transforming frequency generator component corresponding to each armature winding and connected to receive input power from said input circuit and to supply output power to said corresponding armature winding, each said component having flow controlling circuit portions to initiate turn-on and turn-off of such component, and means connecting control signals from separate ones of said locations to corresponding ones of said circuit portions to effect turn-on and turn-off of such component in accordance with angular speed and angular position to apply to said corresponding armature winding a substantially full wave A.C. voltage waveform having a dominant fundamental frequency component that is a constant integer multiple of angular speed and that has a predetermined time phase with respect to instantaneous angular position of said units.

13. A control in accordance with claim 12 and wherein said control includes means operative when said control is connected to said motor structure to provide a group of externally variable performance factors, said group comprising a field excitation magnitude factor determined by said D.C. pole configuration, an applied armature A.C. voltage magnitude factor, and a phase angle factor representative of the relation between an applied armature A.C. voltage vector and a field excitation vector, and means for varying at least one of said factors.

14. In combination, a dynamo electric motor having relatively rotatable rotor and stator members, defining an air gap therebetween, one of said members being an armature having a plurality of A.C. windings distributed thereabout and the other of said members having a D.C. pole configuration mounted thereon in cooperable relation with said armature windings for torque and energy exchange therewith upon relative rotation of said members, and motor control mechanism comprising means for producing a separate control signal at each of a plurality of predetermined relative angular positions of said stator and rotor, a power supplying frequency generating unit having a D.C. power input circuit and a separate electrical power transforming frequency generator component corresponding to each armature winding and connected to receive input power from said input circuit and to supply output power to said corresponding armature winding, each said component having flow controlling circuit portions to initiate turn-on and turn-off of such component, and means connecting control signals from separate ones of said locations to corresponding ones of said circuit portions to effect turn-on and turn-off of such component in accordance with rotor speed and angular position to apply to said corresponding armature winding a substantially full wave A.C. voltage waveform having a dominant fundamental frequency component that is a constant integer multiple of rotor speed and that has a predetermined time phase with respect to instantaneous angular position of the rotor.

15. In combination, a dynamo electric motor having relatively rotatable rotor and stator members, defining an air gap therebetween, one of said members being an armature having a plurality of A.C. windings distributed thereabout and the other of said members having a D.C. pole configuration mounted thereon in cooperable relation with said armature windings for torque and energy exchange therewith upon relative rotation of said members, and motor control mechanism comprising means for producing a separate control signal at each of a plurality of predetermined relative angular positions of said rotor and stator, a power supplying frequency generating unit having positive and negative D.C. power supplying buses, a separate frequency generator component for each armature winding and having positive lobe and negative lobe unidirectional power transmitting circuits connected from said positive and negative buses, respectively, and each connected to the corresponding phase of the armature winding, each said power transmitting circuit having a pair of circuit elements, each pair of circuit elements being comprised of a turn-on flow controlling circuit element and a turn-off flow controlling circuit element, each pair of circuit elements being responsive to control signals from a corresponding pair of said locations to enable relative rotation of said rotor and stator to actuate said circuit elements in a predetermined relationship to effect application to the corresponding phase of the armature winding of a substantially full wave A.C. voltage waveform having a dominant fundamental frequency component that is a constant integer multiple of rotor speed and that has a predetermined time phase with respect to instantaneous angular position of the rotor.

16. In combination, a dynamo electric motor including a stator having a plurality of armature windings distributed about its inner periphery, and a rotor disposed in said stator to define an air gap therebetween, said rotor having a D.C. pole configuration in cooperable relation with said armature windings for torque and energy exchange based on flux linkage across said air gap and upon relative rotation of said stator and rotor; and motor control mechanism comprising commutating means responsive to relative rotation of said members for producing control signals at a rate that is an integer multiple of the speed and at a time spaced sequence that is determined by the armature winding distribution, D.C. pole configuration and instantaneous angular position of the rotor relative to the stator, a D.C. power input circuit, a separate electrical power transforming frequency generator component corresponding to each armature winding and connected to receive power from said input circuit, each said component having positive and negative flow controlling circuit portions separately responsive to corresponding ones of said control signals to effect turn-on, signal polarity, and turn-off of such component in accordance with angular speed and angular position to apply to said corresponding armature winding a substantially full wave A.C. voltage waveform having a dominant fundamental frequency component that is a constant integer multiple of rotor speed and that has a predetermined time phase with respect to instantaneous angular position of the rotor with respect to the stator.

References Cited by the Examiner

UNITED STATES PATENTS

| | | | |
|---|---|---|---|
| 2,700,127 | 1/1955 | Sawyer | 318—175 |
| 2,783,426 | 2/1957 | Pittman | 318—175 X |
| 2,791,734 | 5/1957 | Kieffert | 318—171 |
| 3,020,463 | 2/1962 | MacGregor | 318—175 |

ORIS L. RADER, *Primary Examiner.*